US012675203B2

(12) United States Patent
Su

(10) Patent No.: US 12,675,203 B2
(45) Date of Patent: Jul. 7, 2026

(54) EVENT TRIGGER CONTROL METHOD AND APPARATUS, ELECTRONIC DEVICE, AND MEDIUM

(71) Applicant: VIVO MOBILE COMMUNICATION CO., LTD., Guangdong (CN)

(72) Inventor: Yuezhi Su, Hangzhou (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 157 days.

(21) Appl. No.: 18/588,585

(22) Filed: Feb. 27, 2024

(65) Prior Publication Data

US 2024/0201825 A1 Jun. 20, 2024

Related U.S. Application Data

(63) Continuation of application No. PCT/CN2022/114139, filed on Aug. 23, 2022.

(30) Foreign Application Priority Data

Aug. 30, 2021 (CN) .......................... 202111002225.7

(51) Int. Cl.
| | |
|---|---|
| *G06F 3/048* | (2013.01) |
| *G06F 3/04817* | (2022.01) |
| *G06F 3/0482* | (2013.01) |
| *G06F 3/04845* | (2022.01) |

(52) U.S. Cl.
CPC ........ *G06F 3/04817* (2013.01); *G06F 3/0482* (2013.01); *G06F 3/04845* (2013.01)

(58) Field of Classification Search
CPC .............. G06F 3/04817; G06F 3/0482; G06F 3/04845; G06F 1/14; G06F 3/04842; G06F 3/04847; G06F 3/0486; G06F 3/0488; G06F 3/04883; G06F 9/451; G04G 9/007; G04G 13/02
See application file for complete search history.

(56) References Cited

U.S. PATENT DOCUMENTS

| | | | | |
|---|---|---|---|---|
| 9,921,714 | B1 * | 3/2018 | Shapiro ............... | G06F 3/04817 |
| 10,444,974 | B2 * | 10/2019 | Ha ....................... | G06F 3/04883 |
| 11,010,020 | B2 * | 5/2021 | Li .......................... | G06F 3/0486 |

(Continued)

FOREIGN PATENT DOCUMENTS

| | | |
|---|---|---|
| CN | 105739807 A | 7/2016 |
| CN | 105791667 A | 7/2016 |

(Continued)

*Primary Examiner* — Rashawn N Tillery
(74) *Attorney, Agent, or Firm* — Price Heneveld LLP

(57) ABSTRACT

An event trigger control method and apparatus, an electronic device, and a medium are provided, and pertain to the field of communication technologies. The method includes: receiving a first input for a first application icon of a target application, where the first input is used for moving the first application icon to a window of a target control (101); in response to the first input, determining a target delay duration and a target event, where positions of the first application icon and the window satisfy a preset association relationship, and the target event is related to the target application (102); and triggering the target event when the target delay duration is reached (103).

18 Claims, 13 Drawing Sheets

(56)                    References Cited

U.S. PATENT DOCUMENTS

| | | | | |
|---|---|---|---|---|
| 2013/0174069 A1* | 7/2013 | Lee | ........................ | G06F 3/0486 |
| | | | | 715/769 |
| 2014/0317555 A1* | 10/2014 | Choi | .................. | G06F 3/04817 |
| | | | | 715/781 |
| 2016/0048284 A1* | 2/2016 | Kim | .................... | G06F 3/04817 |
| | | | | 715/770 |
| 2016/0191790 A1* | 6/2016 | Wang | ................... | H04N 23/633 |
| | | | | 348/333.01 |
| 2016/0357371 A1* | 12/2016 | Lee | ........................ | G06F 3/0482 |
| 2017/0344955 A1 | 11/2017 | Kim et al. | | |
| 2020/0167173 A1* | 5/2020 | Wang | ................. | G06F 3/04817 |
| 2020/0233568 A1* | 7/2020 | Wang | ................. | G06F 3/04845 |
| 2024/0053879 A1* | 2/2024 | Wang | ....................... | G09G 5/14 |

FOREIGN PATENT DOCUMENTS

| | | | | | |
|---|---|---|---|---|---|
| CN | 109981890 A | * | 7/2019 | ............ | G06V 40/70 |
| CN | 110515506 A | | 11/2019 | | |
| CN | 111324268 A | * | 6/2020 | ........ | H04M 1/72451 |
| CN | 111866270 A | | 10/2020 | | |
| CN | 113254096 A | | 8/2021 | | |
| CN | 113703896 A | | 11/2021 | | |
| CN | 114766015 A | * | 7/2022 | ........... | G06F 3/0488 |

\* cited by examiner

EVENT TRIGGER CONTROL METHOD AND APPARATUS, ELECTRONIC DEVICE, AND MEDIUM

CROSS-REFERENCE TO RELATED APPLICATIONS

This application is a continuation application of PCT International Application No. PCT/CN2022/114139 filed on Aug. 23, 2022, which claims priority to Chinese Patent Application No. 202111002225.7, filed in China on Aug. 30, 2021, the disclosures of which are incorporated herein by reference in their entireties.

TECHNICAL FIELD

This application pertains to the field of communication technologies, and specifically relates to an event trigger control method and apparatus, an electronic device, and a medium.

BACKGROUND

With continuous development of mobile communication technologies, smart electronic devices (for example, mobile phones) have been increasingly popularized. The operating systems of electronic devices in the related art can be equipped with the Klotski grid system. In addition to allowing for the free adjustment of application sizes, the system includes a nano kits library, which includes rich nano kits such as the original screen time, space cleanup, nano alerts, nano music player, calendar, weather, wallpaper, and schedule, making the mundane desktop instantly vibrant and flexible, and providing excellent user experience.

At present, the timing function on the electronic devices is limited to alarm clock only, and the timing function lacks flexibility and is quite restrictive.

SUMMARY

Embodiments of this application are intended to provide an event trigger control method and apparatus, an electronic device, and a medium.

According to a first aspect, an embodiment of this application provides an event trigger control method. The method includes:

receiving a first input for a first application icon of a target application, where the first input is used for moving the first application icon to a window of a target control;

in response to the first input, determining a target delay duration and a target event, where positions of the first application icon and the window satisfy a preset association relationship, and the target event is related to the target application; and triggering the target event when the target delay duration is reached.

According to a second aspect, an embodiment of this application further provides an event trigger control apparatus, including:

a first receiving module configured to receive a first input for a first application icon of a target application, where the first input is used for moving the first application icon to a window of a target control;

a first processing module configured to, in response to the first input, determine a target delay duration and a target event, where positions of the first application icon and the window satisfy a preset association relationship, and the target event is related to the target application; and a control module configured to trigger the target event when the target delay duration is reached.

According to a third aspect, an embodiment of this application provides an electronic device including a processor, a memory, and a program or instructions stored in the memory and capable of running on the processor, and when the program or instructions are executed by the processor, the steps of the event trigger control method according to the first aspect are implemented.

According to a fourth aspect, an embodiment of this application further provides a readable storage medium, where the readable storage medium stores a program or instructions, and when the program or instructions are executed by a processor, the steps of the event trigger control method according to the first aspect are implemented.

According to a fifth aspect, an embodiment of this application provides a chip. The chip includes a processor and a communication interface, where the communication interface is coupled to the processor, and the processor is configured to run a program or instructions to implement the event trigger control method according to the first aspect.

According to a sixth aspect, a computer program or program product is provided, where the computer program or program product is stored in a non-transient readable storage medium, and the computer program or program product is executed by at least one processor to implement the steps of the event trigger control method according to the first aspect.

According to a seventh aspect, a communication device is provided, configured to perform the steps of the event trigger control method according to the first aspect.

In the embodiments of this application, a first input for a first application icon of a target application is received, where the first input is used for moving the first application icon to a window of a target control; in response to the first input, a target delay duration and a target event are determined, where positions of the first application icon and the window satisfy a preset association relationship, and the target event is related to the target application; and the target event is triggered when the target delay duration is reached.

DESCRIPTION OF EMBODIMENTS

The following clearly describes the technical solutions in the embodiments of this application with reference to the accompanying drawings in the embodiments of this application. Apparently, the described embodiments are only some but not all of the embodiments of this application. All other embodiments obtained by persons of ordinary skill in the art based on the embodiments of this application shall fall within the protection scope of this application.

The terms "first", "second", and the like in the specification and claims of this application are used to distinguish between similar objects rather than to describe a specific order or sequence. It should be understood that data used in this way are interchangeable in appropriate circumstances such that the embodiments of this application can be implemented in an order other than those illustrated or described herein. In addition, "first", "second", and the like are typically used to distinguish objects of a same type and do not limit quantities of the objects. For example, there may be one or more first objects. In addition, in this specification and claims, "and/or" indicates at least one of the connected objects, and the character "/" generally indicates an "or" relationship between the contextually associated objects.

The following describes in detail the event trigger control method provided in the embodiments of this application through specific embodiments and application scenarios thereof with reference to the accompanying drawings.

Figure 1:
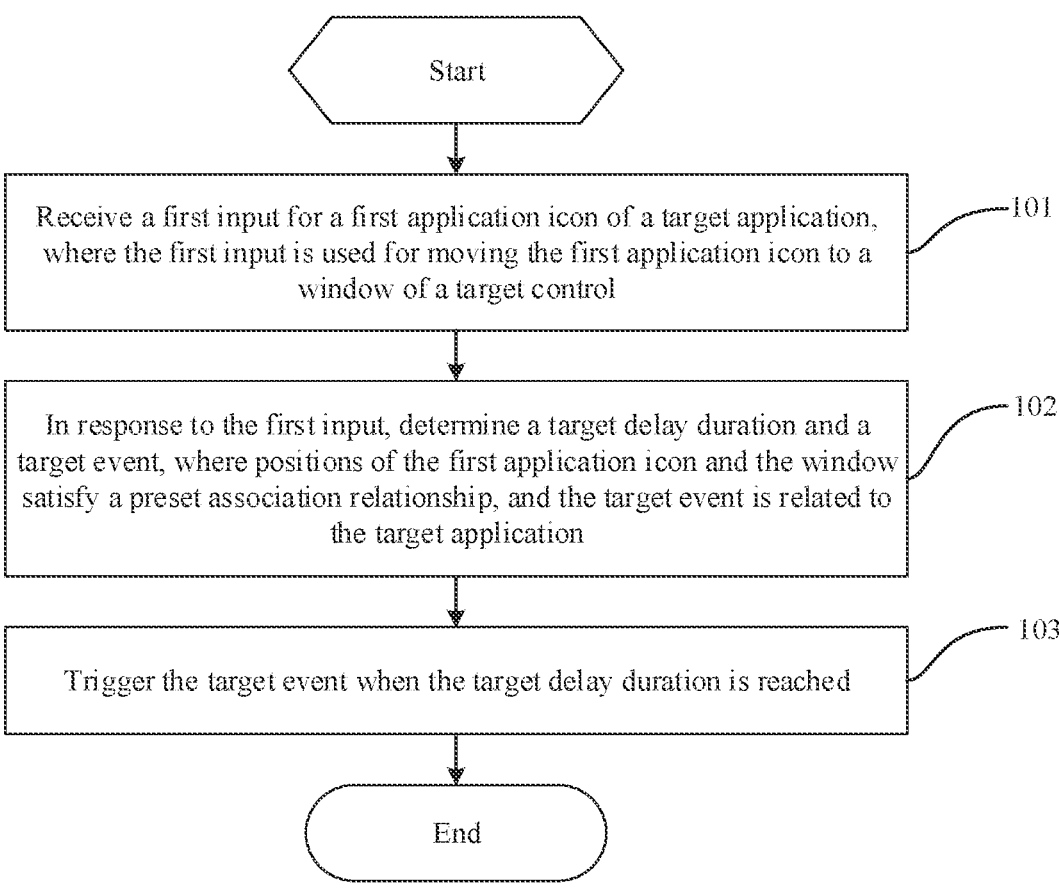
FIG. 1 is a schematic flowchart of an event trigger control method according to an embodiment of this application.

FIG. 1 is a schematic flowchart of an event trigger control method according to an embodiment of this application. The following specifically describes the implementation process of the method with reference to the figure.

Step 101. Receive a first input for a first application icon of a target application, where the first input is used for moving the first application icon to a window of a target control.

Figure 2:
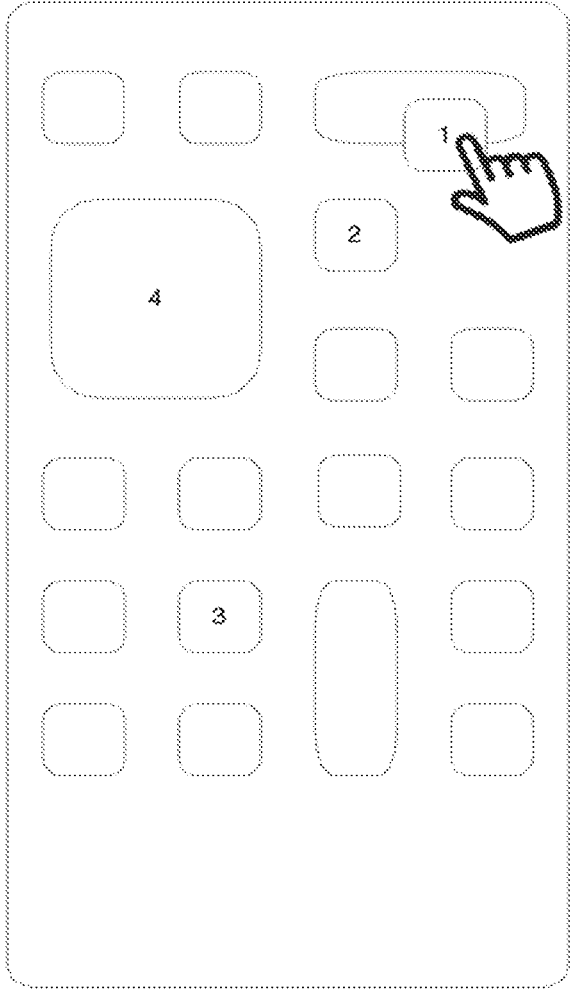
FIG. 2 is a first schematic diagram of a screen corresponding to a step for performing an event trigger control method according to an embodiment of this application.

It should be noted that the method is applied to an electronic device. As shown in FIG. 2, the first application icon of the target application (for example, the application icon of the application 1 in FIG. 2) and the target control (for example, the nano delay timer 6 in FIG. 2) are displayed on a desktop of the electronic device.

Herein, the target control is dragged out of the kits library through user operation and displayed on the desktop.

It should be noted that the control in this embodiment may also be referred to as a nano kit.

Optionally, the target control is a nano delay timer or a cyclic nano delay timer.

Optionally, the first input is a preset input, and the first input may include but is not limited to at least one of a tap input, a press input, a touch and hold input, a pinch input, a drag input, a slide input, and a swipe input for the first application icon. In other words, the first input may be one of the foregoing inputs or a combination of two or more of the foregoing inputs.

Preferably, the first input is a combination of a touch and hold input and a drag input. As shown in FIG. 2, for example, a user touches and holds the application icon of the application 1 displayed on the desktop and drags the application icon over the nano delay timer 6.

Step 102. In response to the first input, determine a target delay duration and a target event, where positions of the first application icon and the window satisfy a preset association relationship, and the target event is related to the target application.

Optionally, the preset association relationship includes:
the first application icon being located in the window; or
the first application icon being located on a border of the window.

Figure 4:
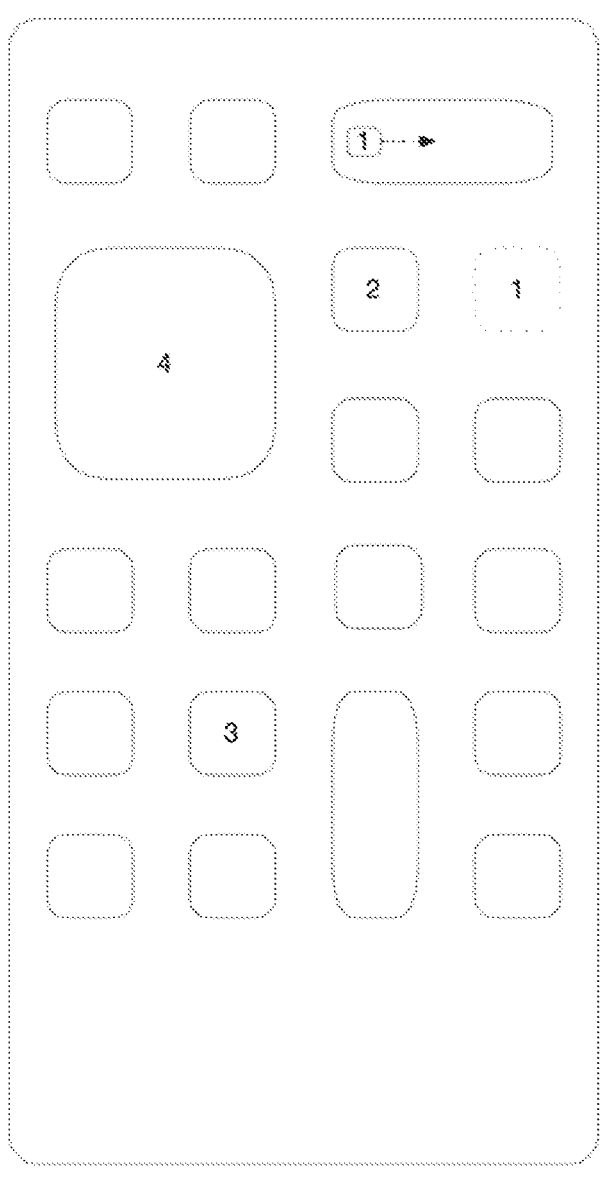
FIG. 4 is a third schematic diagram of a screen corresponding to a step for performing an event trigger control method according to an embodiment of this application.
Figure 8:
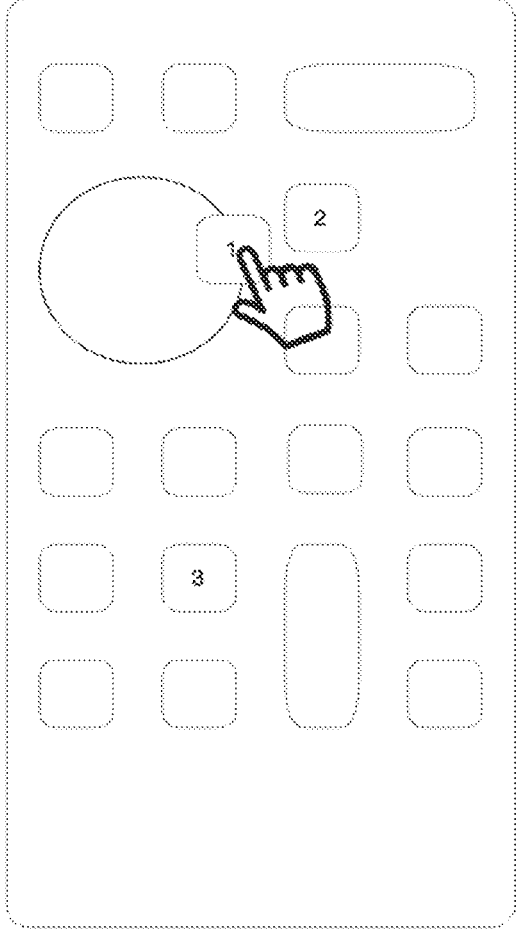
FIG. 8 is a seventh schematic diagram of a screen corresponding to a step for performing an event trigger control method according to an embodiment of this application.

Herein, for the first application icon being located in the window, refer to the application icon of the application 1 in FIG. 4; and for the first application icon being located on a border of the window, refer to the application icon of the application 1 in FIG. 8.

Step 103. Trigger the target event when the target delay duration is reached.

In this step, when a timing duration reaches the target delay duration, the target event related to the target application is triggered, and the electronic device interrupts the running application program.

Herein, the timing starts when the target delay duration and the target event are determined.

According to the event trigger control method in this embodiment of this application, a first input for a first application icon of a target application is received, where the first input is used for moving the first application icon to a window of a target control; in response to the first input, a target delay duration and a target event are determined, where positions of the first application icon and the window satisfy a preset association relationship, and the target event is related to the target application; and the target event is triggered when the target delay duration is reached. In this way, through simple component interaction, the custom delayed event trigger function for application is achieved, such that timing is not limited to alarm clock, making the timing function more flexible and improving use experience of the user.

Optionally, the target delay duration is a preset delay duration, and the target event is a preset event.

Herein, the preset event may be customized by the user or may be a default setting of the system, which is not specifically limited herein.

In this case, the target delay duration for delayed triggering of the target event is the preset delay duration, and the target event is the preset event, which means that the target delay duration has been preset and the target event has also been preset. In response to the first input, that is, at the end of the first input, the timing can start, and the target event is triggered when the timing duration reaches the preset delay duration. In an optional implementation, in step 102 of the method according to this embodiment of this application, the determining a target delay duration includes:

receiving a second input by a user for the first application icon, where the second input is used for moving a position of the first application icon;

in response to the second input, displaying the first application icon at a first position in the window; and determining the target delay duration based on the first position.

This step may specifically include:

in a case that the first position is a position on a first preset track other than a start position and an end position, determining a duration corresponding to a remaining track from the first position to the end position as the target delay duration, where the first preset track corresponds to a preset delay duration for triggering the target event.

It should be noted that this implementation can meet the requirement of the user for adjusting the duration for delayed triggering of the target event.

Figure 7:
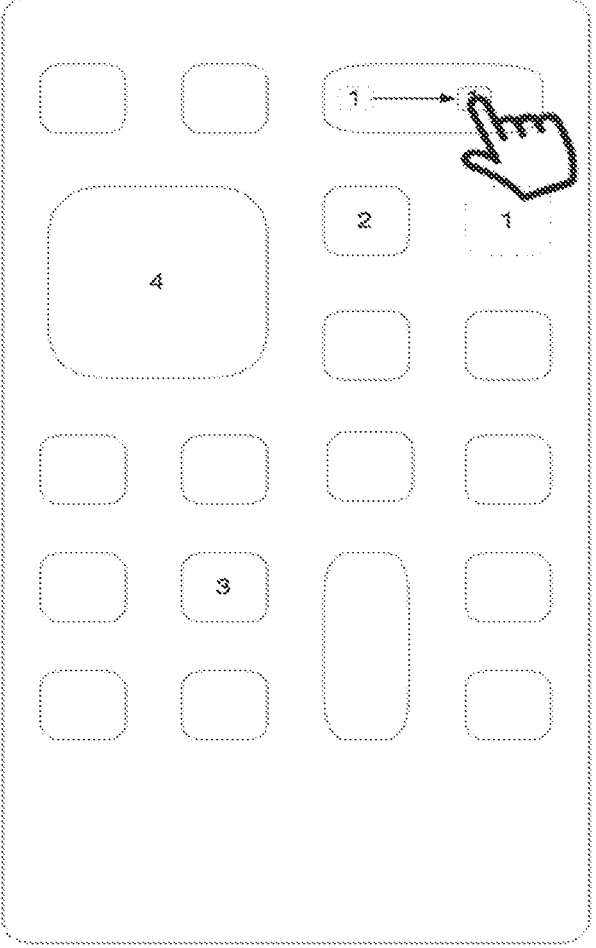
FIG. 7 is a sixth schematic diagram of a screen corresponding to a step for performing an event trigger control method according to an embodiment of this application.

In an example, as shown in FIG. 7, a drag input by the user for the application icon of the application 1 located in the window of the nano delay timer 6 is received, and in response to the drag input, a position of the application icon of the application 1 at the end of the drag input (that is, when the user lifts up the finger) is determined, where the position is the first position, that is, the position at which the user wants the application icon of the application 1 to stop. The first position is the position on the first preset track other than the start position and the end position, and the duration corresponding to the remaining track from the first position to the end position is determined as the target delay duration, where the first preset track corresponds to the preset delay duration for delayed triggering of the target event. In other words, the remaining duration for triggering the target event related to the application 1 can be controlled through user operation.

If the preset delay duration is set to 60 s, the determined target event is "start application", and the application icon of the application 1 is dragged to the middle of the first preset track through user operation, the event "start application" is triggered 30*s* after the drag ends, and the application 1 is automatically started.

Figure 5:
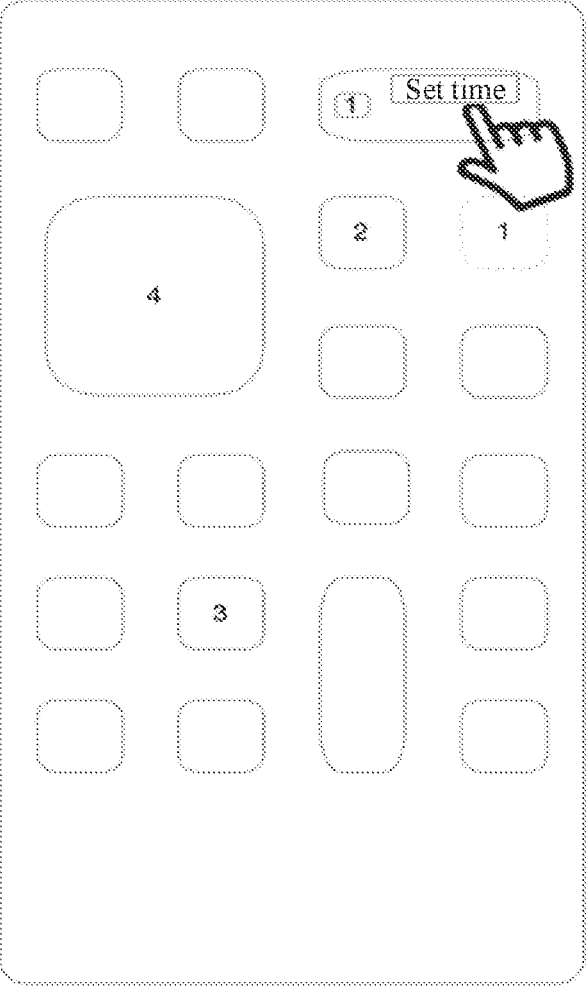
FIG. 5 is a fourth schematic diagram of a screen corresponding to a step for performing an event trigger control method according to an embodiment of this application.
Figure 6:
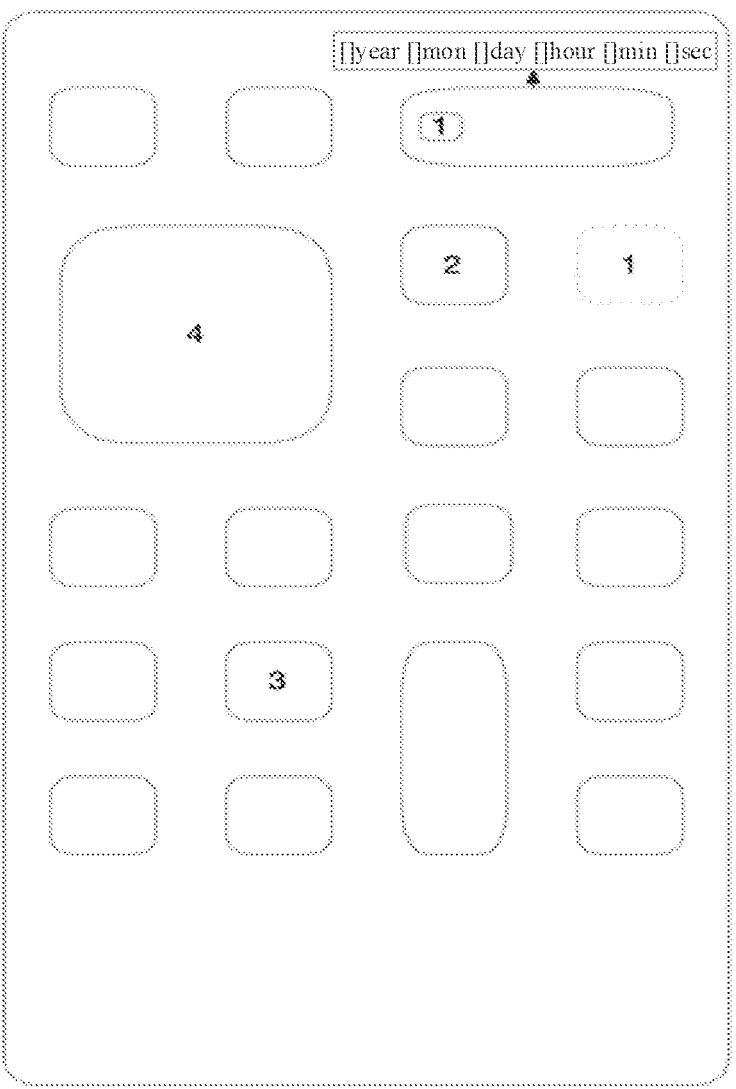
FIG. 6 is a fifth schematic diagram of a screen corresponding to a step for performing an event trigger control method according to an embodiment of this application.

In an optional implementation, in step 102 of the method according to this embodiment of this application, the determining a target delay duration includes:

displaying a delay duration setting icon, where in this step, in response to the first input, the delay duration setting icon is displayed, that is, when the user moves the first application icon to the window of the target control, the display of the delay duration setting icon is triggered, for example, the control "set time" (that is, the delay duration setting icon) shown in FIG. 5;

receiving a third input by a user for the delay duration setting icon, where in this step, the third input is a preset input, and the third input may include but is not limited to at least one of a tap input, a press input, a touch and hold input, a pinch input, a drag input, a slide input, and a swipe input for the first application icon; and in other words, the third input may be one of the foregoing inputs or a combination of two or more of the foregoing inputs; and in response to the third input, determining the target delay duration selected by the user, where in an example, as shown in FIG. 5, a tap input for the control "set time" is received, and in response to the tap input, the user can select a duration from 1 s to 1 year as the target delay duration in the displayed time selection box 7, as shown in FIG. 6.

In this implementation, the user can customize the target delay duration for delayed triggering of the target event based on the user requirement.

In an optional implementation, in step 102 of the method according to this embodiment of this application, the determining a target event includes:

displaying at least one to-be-triggered event of the target application, where in this step, in response to the first input, the at least one to-be-triggered event of the target application is displayed, where the at least one to-be-triggered event may be displayed in the form of a list or in other manners, which is not specifically limited herein;

receiving a fourth input by a user for a first event among the at least one to-be-triggered event, where the first event is one of the at least one to-be-triggered event; and in response to the fourth input, determining the first event as the target event.

The following specifically describes the implementation process of the foregoing implementation with reference to an example.

Figure 3:
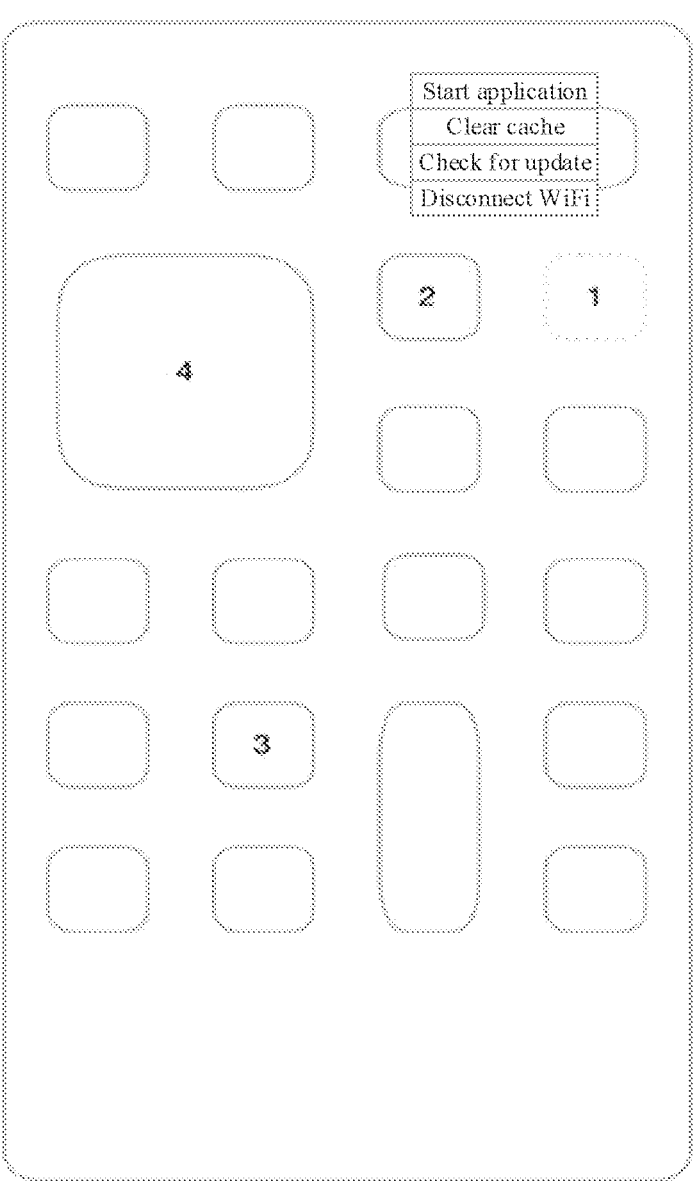
FIG. 3 is a second schematic diagram of a screen corresponding to a step for performing an event trigger control method according to an embodiment of this application.

As shown in FIG. 2, the electronic device receives the first input by the user for the application icon of the application 1, that is, touching and holding the application icon of the application 1 and dragging the application icon over the nano delay timer 6; then, the selectable event list A for delayed triggering is displayed, as shown in FIG. 3; the event list A includes four events: start application, clear cache, check for update, and disconnect wireless fidelity (WiFi); and then, the tap input by the user for the event list A, that is, tapping one of the events, is received, thereby determining the target event related to the application 1.

It should be noted that if the target delay duration is determined based on the delay duration setting icon and the target event is determined based on the at least one to-be-triggered event of the displayed target application, in response to the first input, the delay duration setting icon may be displayed first, the target delay duration is determined through user operation, then the at least one to-be-triggered event of the target application is displayed, and the target event is determined through user operation; or the at least one to-be-triggered event of the target application may be displayed first, the target event is determined through user operation, then the delay duration setting icon is displayed, and the target delay duration is determined through user operation. This is not specifically limited herein.

In an optional implementation, in step 103 of the method according to this embodiment of this application, the triggering the target event when the target delay duration is reached includes:

in a case that the target event is a one-time trigger event, controlling the first application icon to start to move along a second preset track at a first start moment, and stopping the movement and triggering the target event when a movement duration reaches the target delay duration, where the first start moment is a moment when the target delay duration and the target event are determined.

Herein, the foregoing dynamic display can help the user to know the progress of triggering the target event in real time, and also make it more interesting.

It should be noted that the second preset track is located in the window of the target control.

In an example, the application icon of the application 1 starts to slowly move along the second preset track from a start position of the second preset track, that is, the leftmost in FIG. 4, to the right at the first start moment, and the movement is stopped and the target event related to the application 1 is triggered when the movement duration reaches the preset delay duration.

In another example shown in FIG. 7, a drag input by the user for the application icon of the application 1 located in the window of the nano delay timer 6 is received, and in response to the drag input, a position of the application icon of the application 1 at the end of the drag input (that is, when the user lifts up the finger) is determined, where the position is the first position, that is, the position at which the user wants the application icon of the application 1 to stop. The first position is the position on the first preset track other than the start position and the end position, and the duration corresponding to the remaining track from the first position to the end position is determined as the target delay duration (the target delay duration is less than the preset delay duration), where the first preset track corresponds to the preset delay duration for delayed triggering of the target event. Then, the application icon of the application 1 starts to slowly move along the second preset track from the middle (the first position) of the second preset track (that is, the first preset track) to the right, and the movement is stopped and the target event related to the application 1 is triggered when the movement duration reaches the target delay duration.

In the foregoing implementation, through simple component interaction, the custom delayed event trigger function for application is achieved. For example, if the application 1 is a ticket booking APP, and the user worries about forgetting to snap up a ticket at preset time, the foregoing custom delayed event trigger function for application can be used to automatically open the ticket booking APP when the preset time arrives, and even if the ticket booking APP has been opened, it can directly jump to the page where the user booked a ticket before, with no need to turn off the alarm clock first and then open the application, which reduces steps and saves time for the user, improving use experience of the user.

In another optional implementation, in step 103 of the method according to this embodiment of this application, the triggering the target event when the target delay duration is reached includes:

in a case that the target event is a periodically triggered event and the target delay duration is a preset delay duration, controlling the first application icon to start to move along a third preset track at a second start moment, and triggering the target event every time a movement duration reaches the preset delay duration, where the second start moment is a moment when the target delay duration and the target event are determined, and a position at which the first application icon is located at the second start moment is a start position of the third preset track.

Optionally, the third preset track is an end-to-end closed track.

Herein, in the case that the target delay duration is the preset delay duration, that is, in the case that the positions of the first application icon and the window satisfy the preset association relationship, the second input for the first application icon, which is the input for moving the position of the first application icon, is not received.

Specifically, the third preset track may enclose the border of the window of the target control.

Figure 9:
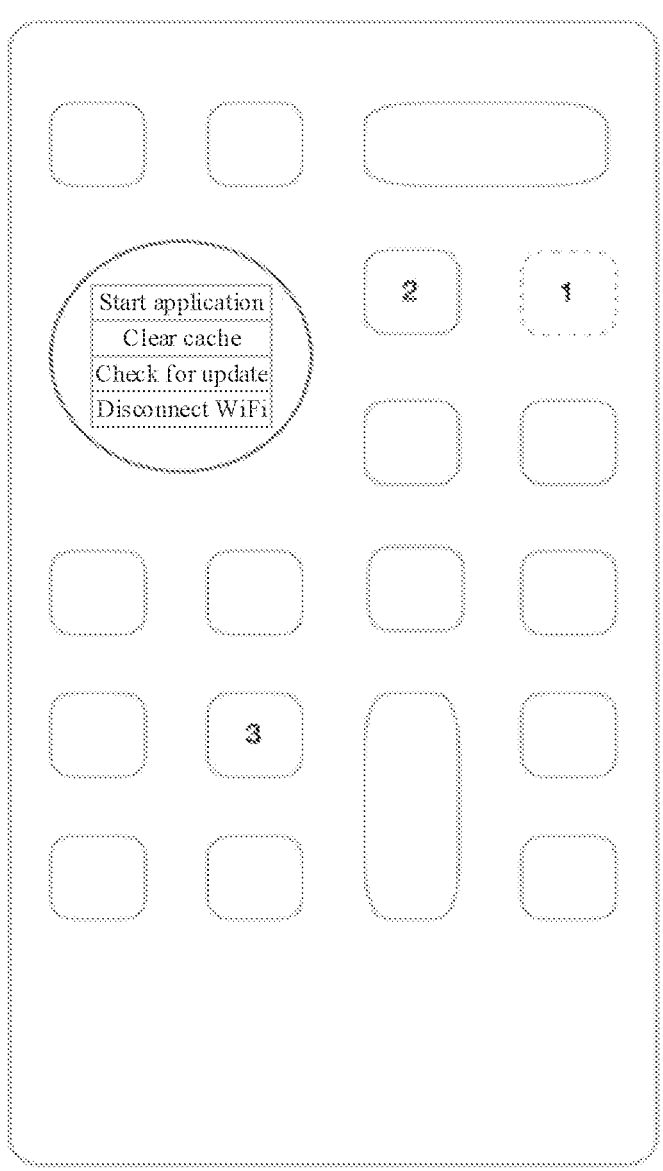
FIG. 9 is an eighth schematic diagram of a screen corresponding to a step for performing an event trigger control method according to an embodiment of this application.

In an example, as shown in FIG. 8, the electronic device receives the first input by the user for the application icon of the application 1, that is, touching and holding the application icon of the application 1 and dragging the application icon over the cyclic nano delay timer 5; then, the selectable event list B for delayed triggering is displayed, as shown in FIG. 9; the event list B includes four events: start application, clear cache, check for update, and disconnect WiFi; and then, the tap input by the user for the event list B, that is, tapping one of the events, is received, thereby determining the periodically triggered target event related to the application 1.

Then, the application icon of the application 1 is located on the border of the window of the cyclic nano delay timer 5, where the window is a circular window. If the preset delay duration is set in advance, the timing starts when the target event is determined. Assuming that the target event is the event "check for update", the application icon of the application 1 is controlled to start to move along the border of the circular window from the start position at the moment when the target event is determined, and the application icon of the application 1 returns to the start position and the event "check for update" is triggered every time the movement duration reaches the preset delay duration.

Assuming that one circle is set to 24 h, the application 1 triggers the event "check for update" every 24 h, and if a new version is found at that time, the new version is automatically downloaded to trigger the update.

Alternatively, in a case that the target event is a periodically triggered event and the target delay duration is less than a preset delay duration, controlling the first application icon to start to move along a third preset track at a third start moment, and triggering the target event when a movement duration reaches the target delay duration, where the third start moment is a moment when the target delay duration and the target event are determined, a position at which the first application icon is located at the third start moment is a second position, the second position is a position on the third preset track other than a start position and an end position, and the first application icon is located at the end position of the third preset track when the movement duration of the first application icon reaches the target delay duration.

Herein, in the case that the target delay duration is less than the preset delay duration, that is, in the case that the positions of the first application icon and the window satisfy the preset association relationship, the second input for the first application icon, which is the input for moving the position of the first application icon, is received.

It should be noted that for the periodically triggered event, only the duration for the current circle is adjusted in response to the received second input, and afterwards, the target event is still periodically triggered based on the preset delay duration.

It should be noted that if the third preset track is an end-to-end closed track, the first application icon is located at the end position of the third preset track, which is also the start position of the third preset track, when the movement duration of the first application icon reaches the target delay duration.

The triggering the target event when the target delay duration is reached further includes: updating the target delay duration to the preset delay duration; and controlling the first application icon to start to move along the third preset track at a fourth start moment, and triggering the target event every time a movement duration reaches the preset delay duration, where the fourth start moment is a moment when the target delay duration is updated, and a position at which the first application icon is located at the fourth start moment is the start position of the third preset track.

The foregoing dynamic display can help the user to know the progress of triggering the target event in real time, and also make it more interesting.

The foregoing implementation of the periodically triggered target event makes the timing task more rich and flexible. For example, a delay event can be set on a short video playback APP to automatically play a video, so the user can create a function "video alarm clock" to automatically play a video at preset time every morning. For another example, an instant messaging APP provides an automatic message sending function, so the user has no need to stay up until midnight to send blessing messages to others one by one on important festivals.

Herein, the target application may be provided in one or plurality. In a case that the target application is provided in plurality, to ensure that positions of icons of the plurality of applications and the window all satisfy the preset association relationship, and also to avoid mutual effect in subsequent dynamic display, in an optional implementation, after the first input for the first application icon of the target application is received, the method according to this embodiment of this application further includes:

reducing size of the first application icon according to a preset ratio.

Figure 10:
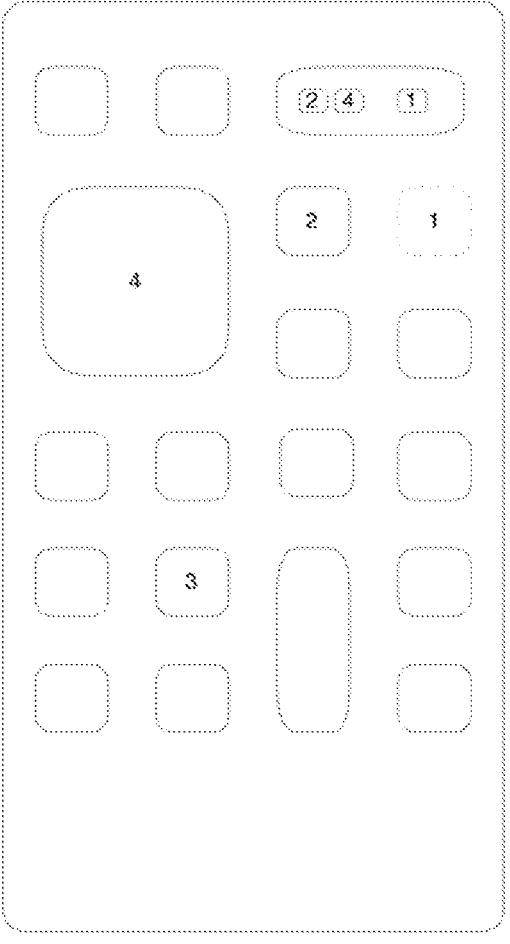
FIG. 10 is a ninth schematic diagram of a screen corresponding to a step for performing an event trigger control method according to an embodiment of this application.
Figure 11:
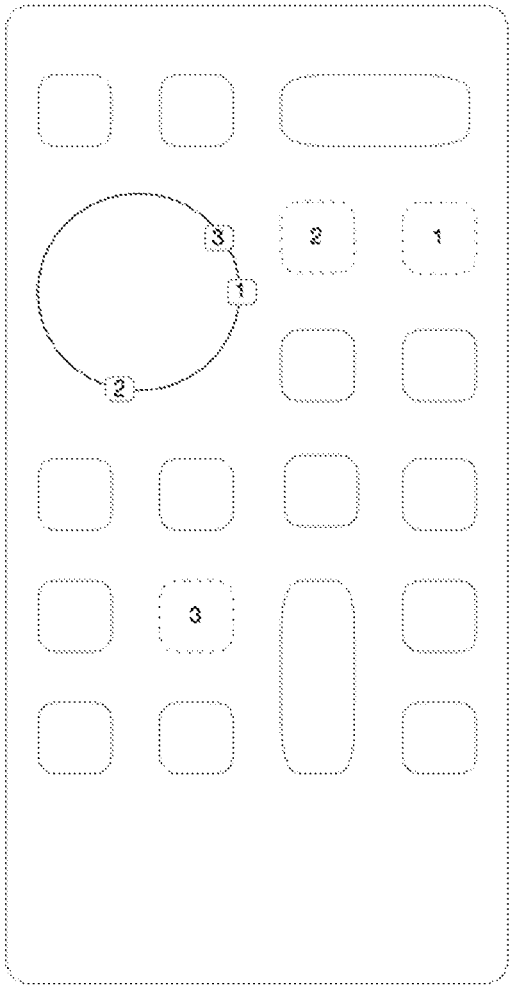
FIG. 11 is a tenth schematic diagram of a screen corresponding to a step for performing an event trigger control method according to an embodiment of this application.

Herein, as shown in FIG. 10, the application icon of the application 2 and the application icon of the application 4 can be moved into the window of the nano delay timer through the touch and hold and drag operations by the user; and as shown in FIG. 11, the application icon of the application 2 and the application icon of the application 3 can be moved into the window of the cyclic nano delay timer through the touch and hold and drag operations by the user.

In this way, the delayed event trigger function for different applications can be achieved, making the timing function more flexible and improving use experience of the user.

According to the event trigger control method in this embodiment of this application, a first input for a first application icon of a target application is received, where the first input is used for moving the first application icon to a window of a target control; in response to the first input, a target delay duration and a target event are determined, where positions of the first application icon and the window satisfy a preset association relationship, and the target event is related to the target application; and the target event is triggered when the target delay duration is reached. In this way, through simple component interaction, the custom delayed event trigger function for application is achieved, such that timing is not limited to alarm clock, making the timing function more flexible and improving use experience of the user.

It should be noted that the event trigger control method provided in this embodiment of this application may be performed by an event trigger control apparatus or a control module for performing the event trigger control method in the event trigger control apparatus. In the embodiments of this application, the event trigger control method being performed by the event trigger control apparatus is used as an example to describe the event trigger control apparatus provided in the embodiments of this application.

Figure 12:
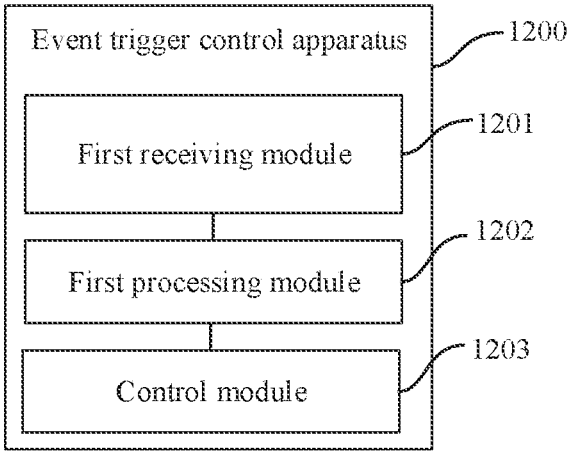
FIG. 12 is a schematic structural diagram of an event trigger control apparatus according to an embodiment of this application.

FIG. 12 is a schematic structural diagram of an event trigger control apparatus according to an embodiment of this application. The event trigger control apparatus 1200 may include:

a first receiving module 1201 configured to receive a first input for a first application icon of a target application, where the first input is used for moving the first application icon to a window of a target control;

a first processing module 1202 configured to, in response to the first input, determine a target delay duration and a target event, where positions of the first application icon and the window satisfy a preset association relationship, and the target event is related to the target application; and a control module 1203 configured to trigger the target event when the target delay duration is reached.

Optionally, the first processing module 1202 includes:

a first receiving unit configured to receive a second input by a user for the first application icon, where the second input is used for moving a position of the first application icon;

a first display unit configured to, in response to the second input, display the first application icon at a first position in the window; and a first processing unit configured to determine the target delay duration based on the first position.

Optionally, the first processing unit is specifically configured to:

in a case that the first position is a position on a first preset track other than a start position and an end position, determine a duration corresponding to a remaining track from the first position to the end position as the target delay duration, where the first preset track corresponds to a preset delay duration for triggering the target event.

Optionally, the first processing module 1202 includes:

a second display unit configured to display a delay duration setting icon;

a second receiving unit configured to receive a third input by a user for the delay duration setting icon; and a second processing unit configured to, in response to the third input, determine the target delay duration selected by the user.

Optionally, the first processing module 1202 includes:

a third display unit configured to display at least one to-be-triggered event of the target application;

a third receiving unit configured to receive a fourth input by a user for a first event among the at least one to-be-triggered event, where the first event is one of the at least one to-be-triggered event; and a third processing unit configured to, in response to the fourth input, determine the first event as the target event.

Optionally, the control module 1203 includes:

a first control unit configured to, in a case that the target event is a one-time trigger event, control the first application icon to start to move along a second preset track at a first start moment, and stop the movement and trigger the target event when a movement duration reaches the target delay duration, where the first start moment is a moment when the target delay duration and the target event are determined.

Optionally, the control module 1203 includes:

a second control unit configured to, in a case that the target event is a periodically triggered event and the target delay duration is a preset delay duration, control the first application icon to start to move along a third preset track at a second start moment, and trigger the target event every time a movement duration reaches the preset delay duration, where the second start moment is a moment when the target delay duration and the target event are determined, and a position at which the first application icon is located at the second start moment is a start position of the third preset track.

Optionally, the control module 1203 includes:

a third control unit configured to, in a case that the target event is a periodically triggered event and the target delay duration is less than a preset delay duration, control the first application icon to start to move along a third preset track at a third start moment, and trigger the target event when a movement duration reaches the target delay duration, where the third start moment is a moment when the target delay duration and the target event are determined, a position at which the first application icon is located at the third start moment is a second position, the second position is a position on the third preset track other than a start position and an end position, and the first application icon is located at the end position of the third preset track when the movement duration of the first application icon reaches the target delay duration;

an updating unit configured to update the target delay duration to the preset delay duration; and a fourth control unit configured to control the first application icon to start to move along the third preset track at a fourth start moment, and trigger the target event every time a movement duration reaches the preset delay duration, where the fourth start moment is a moment when the target delay duration is updated, and a position at which the first application icon is located at the fourth start moment is the start position of the third preset track.

The event trigger control apparatus in this embodiment of this application may be an apparatus or a component, integrated circuit, or chip in a terminal. The apparatus may be a mobile electronic device or a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, a personal digital assistant (PDA), or the like, and the non-mobile electronic device may be a server, a network attached storage (NAS), a personal computer (PC), a television (TV), a teller machine, a self-service machine, or the like. This is not specifically limited in the embodiments of this application.

The event trigger control apparatus in this embodiment of this application may be an apparatus with an operating system. The operating system may be an Android (Android) operating system, an iOS operating system, or another possible operating system. This is not specifically limited in the embodiments of this application.

The event trigger control apparatus provided in this embodiment of this application can implement the processes implemented in the method embodiments shown in FIG. 1 to FIG. 11. To avoid repetition, details are not described herein again.

According to the event trigger control apparatus in this embodiment of this application, a first input for a first application icon of a target application is received, where the first input is used for moving the first application icon to a window of a target control; in response to the first input, a target delay duration and a target event are determined, where positions of the first application icon and the window satisfy a preset association relationship, and the target event is related to the target application; and the target event is triggered when the target delay duration is reached. In this way, through simple component interaction, the custom delayed event trigger function for application is achieved, such that timing is not limited to alarm clock, making the timing function more flexible and improving use experience of the user.

Figure 13:
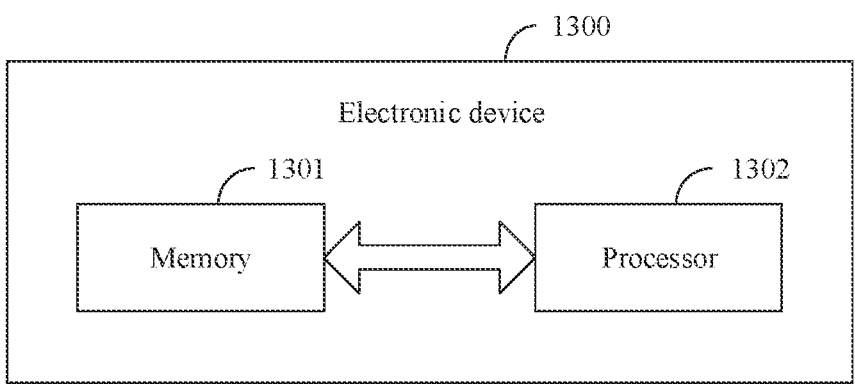
FIG. 13 is a schematic structural diagram of an electronic device according to an embodiment of this application.

Optionally, as shown in FIG. 13, an embodiment of this application further provides an electronic device 1300, including a processor 1302, a memory 1301, and a program or instructions stored in the memory 1301 and capable of running on the processor 1302. When the program or instructions are executed by the processor 1302, the processes of the foregoing embodiments of the event trigger control method are implemented, with the same technical effects achieved. To avoid repetition, details are not described herein again.

It should be noted that the electronic device in this embodiment of this application includes the foregoing mobile electronic device and non-mobile electronic device.

Figure 14:
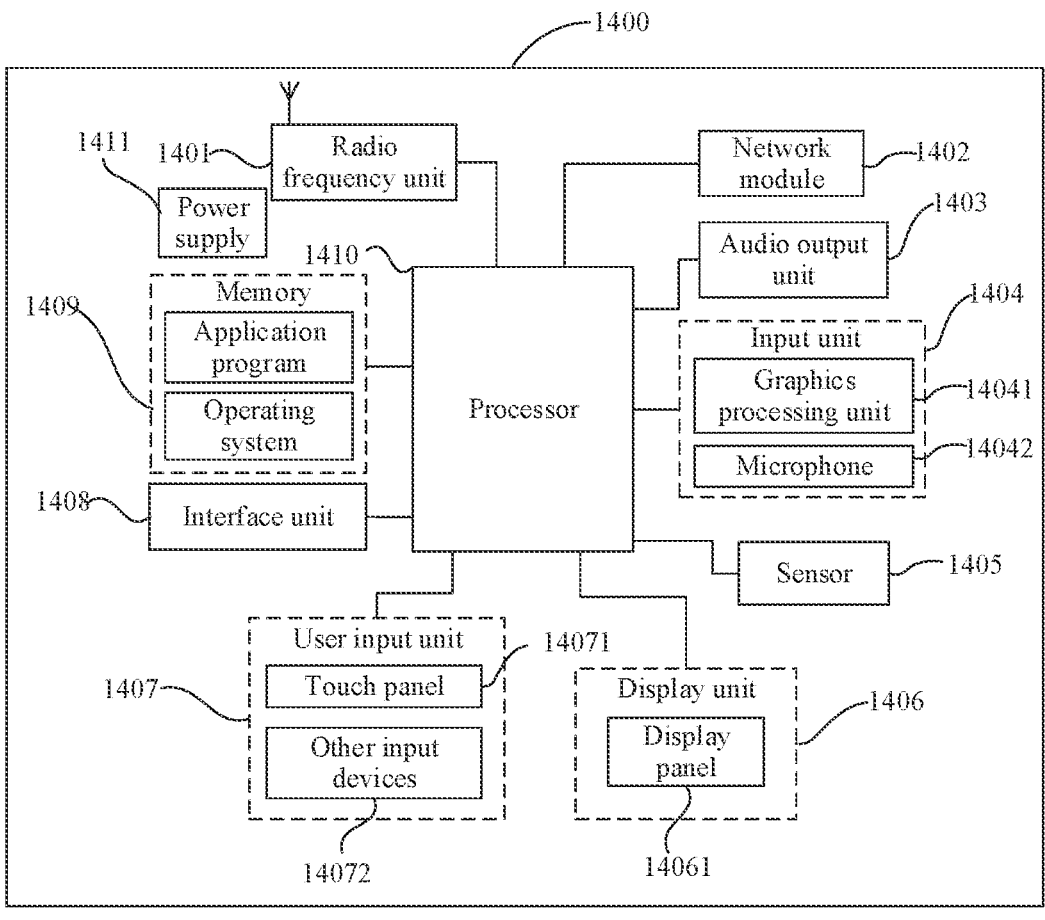
FIG. 14 is a schematic diagram of a hardware structure of an electronic device according to an embodiment of this application.

FIG. 14 is a schematic diagram of a hardware structure of an electronic device for implementing the embodiments of this application.

The electronic device 1400 includes but is not limited to components such as a radio frequency unit 1401, a network module 1402, an audio output unit 1403, an input unit 1404, a sensor 1405, a display unit 1406, a user input unit 1407, an interface unit 1408, a memory 1409, a processor 1410, and a power supply 1411.

Persons skilled in the art can understand that the electronic device 1400 may further include a power supply (for example, a battery) for supplying power to the components. The power supply may be logically connected to the processor 1410 via a power management system, so that functions such as charge management, discharge management, and power consumption management are implemented via the power management system. The structure of the electronic device shown in FIG. 14 does not constitute any limitation on the electronic device. The electronic device may include more or fewer components than shown in the figure, or combine some of the components, or arrange the components differently. Details are not described herein.

The user input unit 1407 is configured to receive a first input for a first application icon of a target application, where the first input is used for moving the first application icon to a window of a target control. The processor 1410 is configured to, in response to the first input, determine a target delay duration and a target event, where positions of the first application icon and the window satisfy a preset association relationship, and the target event is related to the target application; and trigger the target event when the target delay duration is reached.

In the embodiments of this application, through simple component interaction, the custom delayed event trigger function for application is achieved, such that timing is not limited to alarm clock, making the timing function more flexible and improving use experience of the user.

Optionally, the user input unit 1407 is further configured to receive a second input by a user for the first application icon, where the second input is used for moving a position of the first application icon; the display unit 1406 is further configured to, in response to the second input, display the first application icon at a first position in the window; and the processor 1410 is further configured to determine the target delay duration based on the first position.

Optionally, the processor 1410 is further configured to:

in a case that the first position is a position on a first preset track other than a start position and an end position, determine a duration corresponding to a remaining track from the first position to the end position as the target delay duration, where the first preset track corresponds to a preset delay duration for triggering the target event.

Optionally, the display unit 1406 is further configured to display a delay duration setting icon; the user input unit 1407 is further configured to receive a third input by a user for the delay duration setting icon; and the processor 1410 is further configured to, in response to the third input, determine the target delay duration selected by the user.

Optionally, the display unit 1406 is further configured to display at least one to-be-triggered event of the target application; the user input unit 1407 is further configured to receive a fourth input by a user for a first event among the at least one to-be-triggered event, where the first event is one of the at least one to-be-triggered event; and the processor 1410 is further configured to, in response to the fourth input, determine the first event as the target event.

Optionally, the processor 1410 is further configured to:

in a case that the target event is a one-time trigger event, control the first application icon to start to move along a second preset track at a first start moment, and stop the movement and trigger the target event when a movement duration reaches the target delay duration, where the first start moment is a moment when the target delay duration and the target event are determined.

Optionally, the processor 1410 is further configured to:

in a case that the target event is a periodically triggered event and the target delay duration is a preset delay duration, control the first application icon to start to move along a third preset track at a second start moment, and trigger the target event every time a movement duration reaches the preset delay duration, where the second start moment is a moment when the target delay duration and the target event are determined, and a position at which the first application icon is located at the second start moment is a start position of the third preset track.

Optionally, the processor 1410 is further configured to:

in a case that the target event is a periodically triggered event and the target delay duration is less than a preset delay duration, control the first application icon to start to move along a third preset track at a third start moment, and trigger the target event when a movement duration reaches the target delay duration, where the third start moment is a moment when the target delay duration and the target event are determined, a position at which the first application icon is located at the third start moment is a second position, the second position is a position on the third preset track other than a start position and an end position, and the first application icon is located at the end position of the third preset track when the movement duration of the first application icon reaches the target delay duration;

update the target delay duration to the preset delay duration; and control the first application icon to start to move along the third preset track at a fourth start moment, and trigger the target event every time a movement duration reaches the preset delay duration, where the fourth start moment is a moment when the target delay duration is updated, and a position at which the first application icon is located at the fourth start moment is the start position of the third preset track.

In the embodiments of this application, through simple component interaction, the custom delayed event trigger function for application is achieved, such that timing is not limited to alarm clock, making the timing function more flexible and improving use experience of the user.

It should be understood that in this embodiment of this application, the input unit 1404 may include a graphics processing unit (GPU) 14041 and a microphone 14042. The graphics processing unit 14041 processes image data of a static picture or a video that is obtained by an image capture apparatus (for example, a camera) in an image capture mode or a video capture mode. The display unit 1406 may include a display panel 14061, and the display panel 14061 may be configured in a form of a liquid crystal display, an organic light-emitting diode display, or the like. The user input unit 1407 includes a touch panel 14071 and other input devices 14072. The touch panel 14071 is also referred to as a touchscreen. The touch panel 14071 may include two parts: a touch detection apparatus and a touch controller. The other input devices 14072 may include but are not limited to a physical keyboard, a function button (for example, a volume control button or a power on/off button), a trackball, a mouse, and a joystick. Details are not described herein. The memory 1409 may be configured to store a software program and various data which include but are not limited to an application program and an operating system. The processor 1410 may integrate an application processor and a modem processor. The application processor mainly processes an operating system, a user interface, an application program, and the like. The modem processor mainly processes wireless communication. It can be understood that the modem processor may alternatively be not integrated in the processor 1410.

An embodiment of this application further provides a readable storage medium, where the readable storage medium stores a program or instructions, and when the program or instructions are executed by a processor, the processes of the foregoing embodiments of the event trigger control method are implemented, with the same technical effects achieved. To avoid repetition, details are not described herein again.

The processor is a processor in the electronic device in the foregoing embodiments. The readable storage medium includes a computer-readable storage medium, for example, a computer read-only memory (ROM), a random access memory (RAM), a magnetic disk, or an optical disc.

An embodiment of this application further provides a chip. The chip includes a processor and a communication interface, where the communication interface is coupled to the processor, and the processor is configured to run a program or instructions to implement the processes of the foregoing embodiments of the event trigger control method, with the same technical effects achieved. To avoid repetition, details are not described herein again.

It should be understood that the chip mentioned in this embodiment of this application may also be referred to as a system-level chip, a system chip, a chip system, a system-on-chip, or the like.

An embodiment of this application further provides a computer program product, where the computer program product is stored in a readable storage medium, the storage medium may be volatile or non-volatile, and the computer program product is executed by at least one processor to implement the processes of the foregoing embodiments of the event trigger control method, with the same technical effects achieved. To avoid repetition, details are not described herein again.

It should be noted that in the specification, the terms "include", "comprise", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more restrictions, an element preceded by the statement "includes a . . . " does not preclude the presence of other identical elements in the process, method, article, or apparatus that includes the element. In addition, it should be noted that the scope of the method and apparatus in the implementations of this application is not limited to functions being performed in the order shown or discussed, but may further include functions being performed at substantially the same time or in a reverse order, depending on the functions involved. For example, the described method may be performed in an order different from the order described, and steps may be added, omitted, or combined. In addition, features described with reference to some examples may be combined in other examples.

From the foregoing description of the implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such understanding, the technical solutions of this application essentially or the part thereof that contributes to the related art may be implemented in a form of a computer software product. The computer software product is stored in a storage medium (for example, ROM/RAM, a magnetic disk, or an optical disc), and includes several instructions for instructing a terminal (which may be a mobile phone, a computer, a server, a network device, or the like) to perform the method described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. An event trigger control method, comprising:
receiving a first input for a first application icon of a target application, wherein the first input is used for moving the first application icon to a window of a target control;
in response to the first input, determining a target delay duration and a target event, wherein positions of the first application icon and the window satisfy a preset association relationship, and the target event is related to the target application; and
triggering the target event when the target delay duration is reached;
wherein the triggering the target event when the target delay duration is reached comprises:

in a case that the target event is a periodically triggered event and the target delay duration is a preset delay duration, controlling the first application icon to start to move along a third preset track at a second start moment, and triggering the target event every time a movement duration reaches the preset delay duration, wherein the second start moment is a moment when the target delay duration and the target event are determined, and a position at which the first application icon is located at the second start moment is a start position of the third preset track.

2. The method according to claim 1, wherein the determining a target delay duration comprises:
receiving a second input by a user for the first application icon, wherein the second input is used for moving a position of the first application icon;
in response to the second input, displaying the first application icon at a first position in the window; and
determining the target delay duration based on the first position.

3. The method according to claim 2, wherein the determining the target delay duration based on the first position comprises:
in a case that the first position is a position on a first preset track other than a start position and an end position, determining a duration corresponding to a remaining track from the first position to the end position as the target delay duration, wherein the first preset track corresponds to a preset delay duration for triggering the target event.

4. The method according to claim 1, wherein the determining a target delay duration comprises:
displaying a delay duration setting icon;
receiving a third input by a user for the delay duration setting icon; and
in response to the third input, determining the target delay duration selected by the user.

5. The method according to claim 1, wherein the determining a target event comprises:
displaying at least one to-be-triggered event of the target application;
receiving a fourth input by a user for a first event among the at least one to-be-triggered event, wherein the first event is one of the at least one to-be-triggered event; and
in response to the fourth input, determining the first event as the target event.

6. The method according to claim 1, wherein the triggering the target event when the target delay duration is reached further comprises:
in a case that the target event is a one-time trigger event, controlling the first application icon to start to move along a second preset track at a first start moment, and stopping the movement and triggering the target event when a movement duration reaches the target delay duration, wherein the first start moment is a moment when the target delay duration and the target event are determined.

7. The method according to claim 1, wherein the triggering the target event when the target delay duration is reached further comprises:
in a case that the target event is a periodically triggered event and the target delay duration is less than a preset delay duration, controlling the first application icon to start to move along a third preset track at a third start moment, and triggering the target event when a movement duration reaches the target delay duration, wherein the third start moment is a moment when the target delay duration and the target event are determined, a position at which the first application icon is located at the third start moment is a second position, the second position is a position on the third preset track other than a start position and an end position, and the first application icon is located at the end position of the third preset track when the movement duration of the first application icon reaches the target delay duration;

updating the target delay duration to the preset delay duration; and controlling the first application icon to start to move along the third preset track at a fourth start moment, and triggering the target event every time a movement duration reaches the preset delay duration, wherein the fourth start moment is a moment when the target delay duration is updated, and a position at which the first application icon is located at the fourth start moment is the start position of the third preset track.

8. An electronic device, comprising a processor, a memory, and a program or instructions stored in the memory and capable of running on the processor, wherein when the program or instructions are executed by the processor, following steps are implemented:

receiving a first input for a first application icon of a target application, wherein the first input is used for moving the first application icon to a window of a target control;

in response to the first input, determining a target delay duration and a target event, wherein positions of the first application icon and the window satisfy a preset association relationship, and the target event is related to the target application; and triggering the target event when the target delay duration is reached;

wherein the triggering the target event when the target delay duration is reached comprises:

in a case that the target event is a periodically triggered event and the target delay duration is a preset delay duration, controlling the first application icon to start to move along a third preset track at a second start moment, and triggering the target event every time a movement duration reaches the preset delay duration, wherein the second start moment is a moment when the target delay duration and the target event are determined, and a position at which the first application icon is located at the second start moment is a start position of the third preset track.

9. The electronic device according to claim 8, wherein the determining a target delay duration comprises:

receiving a second input by a user for the first application icon, wherein the second input is used for moving a position of the first application icon;

in response to the second input, displaying the first application icon at a first position in the window; and determining the target delay duration based on the first position.

10. The electronic device according to claim 9, wherein the determining the target delay duration based on the first position comprises:

in a case that the first position is a position on a first preset track other than a start position and an end position, determining a duration corresponding to a remaining track from the first position to the end position as the target delay duration, wherein the first preset track corresponds to a preset delay duration for triggering the target event.

11. The electronic device according to claim 8, wherein the determining a target delay duration comprises:

displaying a delay duration setting icon;

receiving a third input by a user for the delay duration setting icon; and in response to the third input, determining the target delay duration selected by the user.

12. The electronic device according to claim 8, wherein the determining a target event comprises:

displaying at least one to-be-triggered event of the target application;

receiving a fourth input by a user for a first event among the at least one to-be-triggered event, wherein the first event is one of the at least one to-be-triggered event; and in response to the fourth input, determining the first event as the target event.

13. The electronic device according to claim 8, wherein the triggering the target event when the target delay duration is reached further comprises:

in a case that the target event is a one-time trigger event, controlling the first application icon to start to move along a second preset track at a first start moment, and stopping the movement and triggering the target event when a movement duration reaches the target delay duration, wherein the first start moment is a moment when the target delay duration and the target event are determined.

14. The electronic device according to claim 8, wherein the triggering the target event when the target delay duration is reached further comprises:

in a case that the target event is a periodically triggered event and the target delay duration is less than a preset delay duration, controlling the first application icon to start to move along a third preset track at a third start moment, and triggering the target event when a movement duration reaches the target delay duration, wherein the third start moment is a moment when the target delay duration and the target event are determined, a position at which the first application icon is located at the third start moment is a second position, the second position is a position on the third preset track other than a start position and an end position, and the first application icon is located at the end position of the third preset track when the movement duration of the first application icon reaches the target delay duration;

updating the target delay duration to the preset delay duration; and controlling the first application icon to start to move along the third preset track at a fourth start moment, and triggering the target event every time a movement duration reaches the preset delay duration, wherein the fourth start moment is a moment when the target delay duration is updated, and a position at which the first application icon is located at the fourth start moment is the start position of the third preset track.

15. A non-volatile readable storage medium, wherein non-volatile the readable storage medium stores a program or instructions, and when the program or instructions are executed by a processor, following steps are implemented:

receiving a first input for a first application icon of a target application, wherein the first input is used for moving the first application icon to a window of a target control;

in response to the first input, determining a target delay duration and a target event, wherein positions of the first application icon and the window satisfy a preset association relationship, and the target event is related to the target application; and triggering the target event when the target delay duration is reached;

wherein the triggering the target event when the target delay duration is reached comprises:

in a case that the target event is a periodically triggered event and the target delay duration is a preset delay duration, controlling the first application icon to start to move along a third preset track at a second start moment, and triggering the target event every time a movement duration reaches the preset delay duration, wherein the second start moment is a moment when the target delay duration and the target event are determined, and a position at which the first application icon is located at the second start moment is a start position of the third preset track.

16. The non-volatile readable storage medium according to claim 15, wherein the determining a target delay duration comprises:

receiving a second input by a user for the first application icon, wherein the second input is used for moving a position of the first application icon;

in response to the second input, displaying the first application icon at a first position in the window; and determining the target delay duration based on the first position.

17. The non-volatile readable storage medium according to claim 16, wherein the determining the target delay duration based on the first position comprises:

in a case that the first position is a position on a first preset track other than a start position and an end position, determining a duration corresponding to a remaining track from the first position to the end position as the target delay duration, wherein the first preset track corresponds to a preset delay duration for triggering the target event.

18. The non-volatile readable storage medium according to claim 15, wherein the determining a target delay duration comprises:

displaying a delay duration setting icon;

receiving a third input by a user for the delay duration setting icon; and in response to the third input, determining the target delay duration selected by the user.

* * * * *